INVENTOR.
ROY F. SCHMOOCK

July 12, 1966 R. F. SCHMOOCK 3,260,109
ELECTROMAGNETIC FLOWMETER MEASURING APPARATUS
Filed April 24, 1962 3 Sheets-Sheet 3

INVENTOR.
ROY F. SCHMOOCK
BY
ATTORNEYS

United States Patent Office

3,260,109
Patented July 12, 1966

3,260,109
ELECTROMAGNETIC FLOWMETER
MEASURING APPARATUS
Roy F. Schmoock, Ivyland, Pa., assignor to Fischer & Porter Company, Warminster, Pa., a corporation of Pennsylvania
Filed Apr. 24, 1962, Ser. No. 189,837
16 Claims. (Cl. 73—194)

This invention relates to measuring apparatus and particularly to a useful element of such apparatus involving conversion of a variable frequency signal into an alternating current of fixed frequency having an amplitude accurately proportional to the variable frequency. The invention further relates to apparatus using the foregoing.

The objects of the present invention may be made clearer by a preliminary consideration of certain particular problems arising in matters of measurement. In the case of flow measurements it is often desirable to effect integration with respect to time of a signal proportional to rate of flow to attain a measurement of total flow. If a signal proportional to flow rate is converted into pulses having a frequency proportional to the flow rate, counting of the pulses will give the total flow. While various devices are known which will convert a direct current signal (or alternating current signals through a direct current signal) into pulses having a frequency more or less proportional to that signal, such devices are generally rather non-linear, inaccurate, and subject to drifts. The devices mentioned are, variously, multivibrators, blocking oscillators, or the like.

In accordance with the present invention, this result is achieved but in an indirect fashion, with achievement of a high degree of accuracy and practically complete independence of changes of circuit components, variations of supply voltages, temperature, and the like. A main component of the apparatus of the invention is a converter of frequency to an alternating current signal having an amplitude accurately linearly proportional to the frequency. This, as will later appear, is achieved by sampling an alternating reference signal by relatively higher variable frequency signals to give an output which is in phase with the reference signal and which has an amplitude proportional to the variable frequency. While this converter has other uses, and is considered per se part of the invention, it has particular utility in systems of the following type:

Specifically, let us consider an electromagnetic flowmeter. In such a flowmeter a magnetic field extends transversely of a flowing fluid and electrodes which are at right angles to the direction of flow and also to the magnetic field have produced in them signals proportional to the rate of flow. It has been found that for practical operation, and particularly to obtain useful signals, which are generally very small against a high noise background, the magnetic field should be alternating, so that the signals picked up by the electrodes are also alternating at the frequency of the supply giving rise to the field. A typical flowmeter of this type is described in the patent to Head No. 3,005,342, dated October 24, 1961. As disclosed in that patent, a feedback is provided bucking the electrode signals to provide an error signal which is amplified to control the feedback signal in such a fashion as to reduce the error signal substantially to zero. The feedback signal is measured to give the rate of flow. If, then, the feedback signal could give rise to pulses having a frequency proportional to its amplitude, the counting of such pulses would give an integration with respect to time of the flow rate, serving as a measure of total flow.

In accordance with the present invention, the feedback signal is not converted into pulses directly; rather, there is utilized a system as follows:

A nulling feedback is provided so that, as heretofore stated, an error signal is produced. This error signal controls a variable frequency generator, but the control of this generator need not be at all carefully related to the controlling error signal, non-linearity and drift being permissible. The pulses from the variable signal generator are used to sample a reference alternating voltage which is in phase with the signals picked up by the electrodes. This sampling gives rise to an alternating signal in phase with the reference signal but which has an amplitude very accurately proportional to the frequency of the variable frequency pulses. This last signal, then, provides the feedback bucking the electrode signal.

The result of this system can now be appreciated. Unless the feedback produces a substantially zero error signal, the error signal will produce variations in the variable frequency pulses until the error signal is nulled. When this occurs, the pulse frequency is an accurate linear measurement of the amplitude of the feedback signal and, therefore, the signal picked up by the electrodes to which it is equated. Counting of the pulses then gives a highly accurate measure of the total flow.

In the electromagnetic flowmeters attention must be given to the suppression of quadrature signals, and in accordance with the invention a generally similar system is used to provide a quadrature feedback. But the pulses here involved have no significance with respect to their frequency, and consequently, as will appear later, a less accurate frequency-to-amplitude signal converter may be used to achieve the nulling of the quadrature signal.

The foregoing will make evident the broader applicability of the invention, since what has been described with reference to an electromagnetic flowmeter may obviously be applied to many other measuring instruments which give rise to an alternating signal requiring measurement, particularly with integration. In fact, the invention is readily applicable to measurement and integration of direct signals merely by their transformation by a chopper or the like to alternating signals with reconversion to direct feedback signals by synchronous rectification. Furthermore, the desired results are achieved without the use of rebalancing motors which give rise to problems of dead zones, hunting, responses to transient fluctuations, etc.

The general objects of the invention and their attainment, as well as other more detailed objects, will become apparent from the following description, read in conjunction with the accompanying drawings, in which:

FIGURES 1A and 1B conjointly show in schematic form the application of the invention to an electromagnetic flowmeter;

Figures 1A, 2:
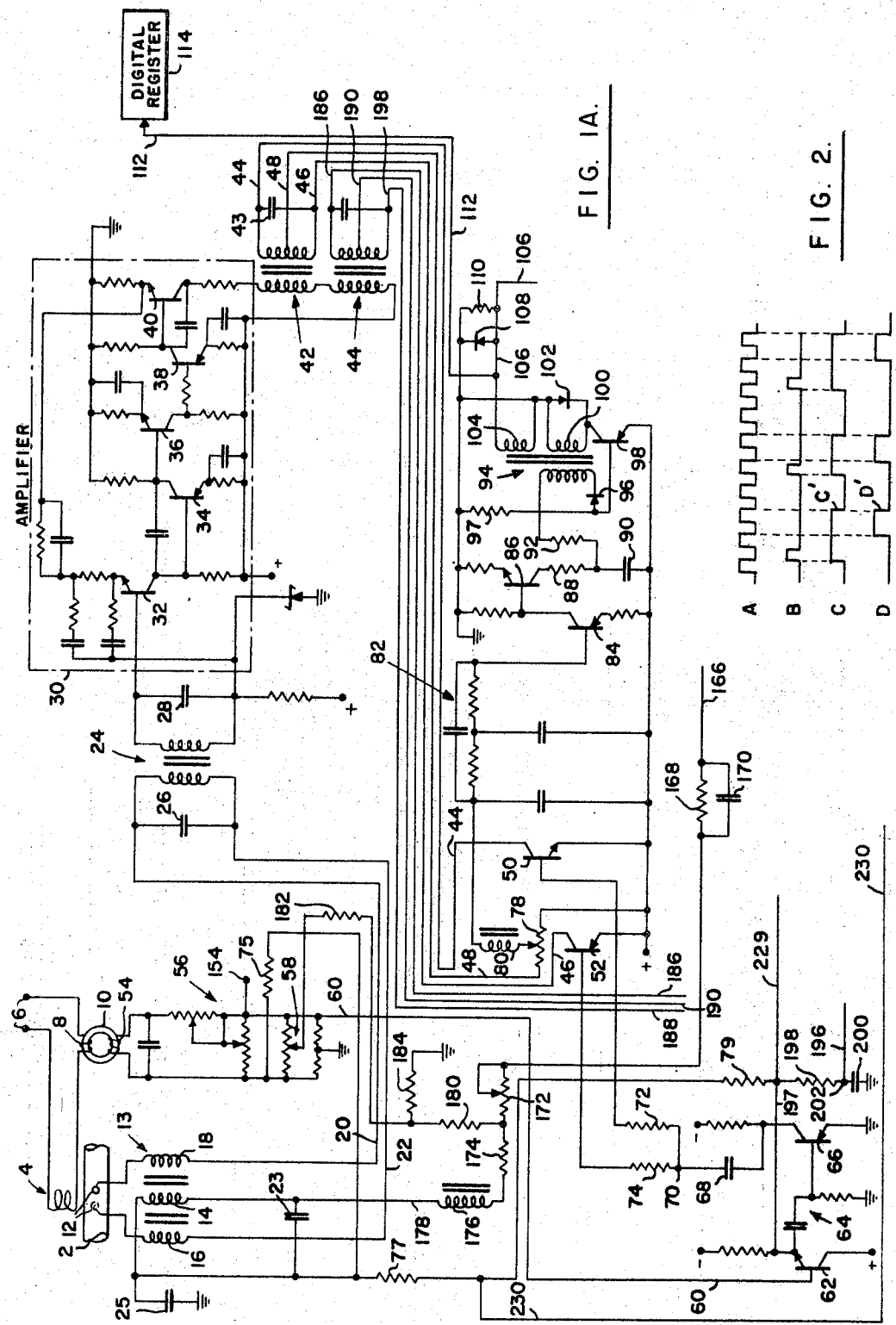
FIGURE 2 is a diagram illustrating certain waveforms which are produced in the apparatus.

A conduit 2 carries the fluid (usually a liquid) the flow of which is to be measured. An electromagnet, the construction of which is conventional and need not be described, provides a magnetic field transverse to the direction of flow, excitation being provided from one or more windings 4 connected to an alternating current supply source indicated at 6 which may be, for example, the usual 60 cycle lines, there being in series with the winding 4 the primary 8 of a toroidal transformer 10 the purpose of which will be later described. For consistency, 60 cycle operation will be assumed, though obviously this is quite arbitrary.

Electrodes 12 in contact with the flowing fluid are arranged on a transverse line which is perpendicular both to the direction of flow and the magnetic field. As is well known, the flow provides an alternating signal through these electrodes which is substantially proportional in the flow rate. A transformer 13 has a primary winding 14 and two secondaries 16 and 18 each of which has one terminal connected to a respective electrode 12. As will appear, an input to the primary winding 14 is arranged to buck the signals from the electrodes, the connections being properly made, so that an error signal is provided between the leads 20 and 22. The primary winding 14 also inputs a quadrature signal to null quadrature components at the output of an amplifier.

A capacitor 23 is connected across the primary winding 14 of the transformer, and its upper terminal is connected to ground through the capacitor 25.

The leads 20 and 22 feed the primary winding of a transformer 24, the primary winding being shunted by a capacitor 26 while the secondary is shunted by a capacitor 28 to provide tuning at the supply frequency. The secondary of transformer 24 feeds an amplifier of high gain type which is conventional and comprises the successive transistors 32, 34, 36, 38 and 40, feedbacks being provided to secure reasonable fidelity of amplification. It will be understood that many types of high grade amplifiers may be here used.

The output of the amplifier 30 passes in series through the primary windings of a pair of transformers 42 and 4. The transformer 42 is in the in-phase system of the apparatus and its connections will be first described.

Its secondary is tuned to the supply frequency of terminals 6 by means of a capacitor 43. The secondary of transformer 42 has its ends connected to the leads 44 and 46 and a center tap connected to the lead 48.

The lead 44 is connected to the collector of an NPN transistor 50, the emitter of which is connected to a positive supply terminal. (Positive and negative supply terminals described herein will be understood to be with reference to ground of a conventional D.C. power supply, not diagrammed.) The lead 46 is connected to the collector of a PNP transistor 52, the emitter of which is also connected to the same positive supply terminal.

(It may be here noted that these transistors are alternating current operated and reference is made to the positive terminal only because of other connections hereafter mentioned; i.e., these transistors are not powered by the D.C. supply.)

To understand the operation of transistors 50 and 52, turn must be made to consideration of transformer 10 which is provided with the secondary 54. The output of this secondary is fed to a phase and amplitude adjusting network 56 which need not be described in detail, though it may be noted that it is provided with a potentiometer 7, having connections hereafter described, and provides an output for immediate consideration along line 60. It may be here remarked that various phase and other adjustments are provided throughout the system to correct base conditions for shifts occurring in the apparatus and to provide proper amplitudes for operation. These adjustments are generally similar to those described in the said patent and need not be considered in detail.

The connection 60 is to the base of a transistor 62 provided with emitter follower connections to prevent loading of the transformer 10. The follower provides its output through the phase adjusting network 64 to the base of transistor 66, the collector of which feeds, through capacitor 68 the terminal 70 which is connected through respective resistors 72 and 74 to the bases of transistors 50 and 52. The arrangement running from transformer 10 to these bases provides an in-phase signal thereto.

The arrangement is such as to provide synchronous full wave rectification of in-phase signals as follows:

The in-phase approximately square waves (so shaped by reason of the large signals applied to transistor 66) applied to the bases of transistors 50 and 52 turn them alternately on and off, transistor 50 being conductive when its base is positive with respect to its emitter and transistor 52 being conductive when its base is negative with respect to its emitter. Assuming that connection 44 to the collector of transistor 50 is positive when this transistor is conducting, current will flow through the transistor and from right to left through the potentiometer 78 in return to the center tap of transformer 42. The tap of this potentiometer is then negative with respect to its right-hand terminal. During the second half cycle the transistor 50 is turned off so that no current flows therethrough. Consider, now, transistor 52 for the same cycle. During the first half cycle its collector is negative, but it is turned off because of the positive wave applied to its base. During the second half cycle, transistor 52 is turned on by the negative half wave applied to its base, but its collector is positive so that current flows through it and the potentiometer as before, since the transistors act bidirectionally when turned on. The result, then, is the provision during the cycle under consideration of a net direct negative current to the contact of the potentiometer.

Suppose, however, that due to reversal of the error signal the in-phase signal from the transformer 42 was reversed in sign (or 180° out-of-phase). In that case, the same type of operations occur as just described but the current flow through potentiometer 78 is reversed, giving a positive current to the potentiometer contact. The direct component thereat, therefore, would be reversed in sign.

The synchronous rectification rejects quadrature components. Without going into detail, if the operation is followed it will be found that quadrature signals appearing in lines 44 and 46 will give rise to double frequency waves without any direct component appearing at the contact of potentiometer 78.

To summarize, therefore, direct net negative or positive pulses appear at the potentiometer contact due to in-phase error signals and in dependence on the sign of the error; quadrature signals make no D.C. contribution thereat.

At this point there may be mentioned the connections running from the network 56 through resistors 75, 77 and 79 to the emitter of transistor 62. The connection through resistor 75 provides an offset signal to capacitor 25, which thereat is a quadrature signal.

The contact of potentiometer 78 is connected through a filtering arrangement, comprising the choke 80 and the network 82, to the base of transistor 84, alternating components being eliminated by the filtering action so that substantially pure direct potential appears at this base. The transistor 84 is associated with a second transistor 86 as a direct current amplifier which, upon reception of a negative signal at the base of transistor 84 charges through resistor 88 the capacitor 90 giving rise to a negative charge at its upper terminal which in magnitude corresponds (though not necessarily linearly) to the magnitude of the signals received from the transformer 42.

The capacitor 90 is connected through resistor 92 to one winding of a transformer 94 and thence through a diode 96, polarized as indicated, to ground through resistor 97 and to the base of a transistor 98. The transistor 98 in conjunction with the transformer 94 provides a conventional blocking oscillator, the transformer 94 having a winding 100 shunted by a diode 102 and an output winding 104. The operation of the blocking oscillator is essentially conventional, but its control by the potential applied to the capacitor 90 may be considered. As already indicated, the capacitor 90 has its upper terminal negatively charged by a current through transistor 86 which current depends upon the input of the transistor 84. When the upper terminal of capacitor 90 is negative, the transistor 98 will conduct and be in oscillating condition. However, when oscillation occurs the current through the base of transistor 98 will, as will be evident from the connection, drive the upper terminal of capacitor 90 positive. When the upper terminal becomes positive the transistor is cut off, and its oscillating condition will not be resumed for an interval which depends on the rate of build-up of negative potential on the capacitor terminal which in turn is dependent upon the magnitude of the error signal originating at the input to amplifier 30 and appearing at transformer 42. It will be evident that the rate of negative charging of the capacitor is dependent on this input signal; and, in fact, the charging rate is more or less linearly dependent thereon. Accordingly, the frequency of repetition of oscillation depends upon the input signal. The blocking oscillator may have a typical range of frequency variation from 0 to 50 kilocycles, greatly in excess, at the upper limit, of the supply frequency. This relationship should hold for any arbitrary supply frequency.

The output from the winding 104 of transformer 94 is delivered to connection 106 which has a connection to ground through diode 108, shunted by resistor 110. The diode 108 effects clamping to suppress "ringing" of the oscillator.

A connection 112 from 106 runs to a digital register 114 which may be of conventional type preferably having a counting range from 0 to 50 kilocycles. Typically the negative pulses fed to this resulting from the operation of the blocking oscillator are about 2 to 3 microseconds in width. Typically such a register will have several electronic stages to reduce the higher frequencies to a suitable range to be counted by subsequent mechanical counter stages and for ultimate indicating and for recording. This digital register serves as an integrator to give a measure of total flow. It is, of course, as is conventional, resettable so that the start and termination of counts may be controlled to provide desirable intervals of integration.

At this point, to avoid misevaluation, it may be pointed out that what has so far been described would not serve to give accurate flow measurement. While the blocking oscillator is desirably highly sensitive for variations in the frequency to changes of signals appearing at the base of transistor 84 and dependent upon the output from transformer 42, there is no need in the present apparatus to achieve any highly linear relationship of frequency to the magnitude of the controlling input of the oscillator. As will be brought out more fully hereafter, the operation of the complete apparatus is such that irrespective of the matters just mentioned the counts emitted to the digital register are very accurately controlled to conform with the original signal representing flow, the feedback arrangement maintaining the proper relationship.

An oscillator operating, for example, at a frequency of 100 kilocycles per second, and at any rate higher than the highest used pulsing rate produced by the blocking oscillator, is provided by the transistor 116, the frequency-controlling crystal 118 and the transformer 120, conventionally connected, the windings of the transformer being suitably tuned by the capacitors 122 and 124. The emitter of transistor 116 is connected through resistor 125 and a tunnel diode 126 to the positive supply line. The junction between the resistor 125 and the diode is connected to the base of a transistor 128. This arrangement of the tunnel diode and transistor provides pulse shaping to furnish from the collector of the transistor 128 a square wave which is fed in conventional fashion to a bistable multivibrator comprising the transistors 130 and 132 connected in a generally conventional circuit, with their bases connected through respective resistors 131 and 133 to a negative potential terminal 135, the potential of which exceeds that of the negative potential terminal to which the emitter of transistor 130 is returned. The usual cross-coupling RC connections are provided between the bases and collectors of the transistors. The emitter of transistor 132 is connected to the collector of a transistor 138, the emitter of which is returned to the same negative terminal as that connected to the emitter of transistor 130. The purpose of transistor 138 is to hold the multivibrator in reset condition statically. The connection 106 previously described is connected through capacitor 140 and diode 142 to the base of transistor 138. The junction between the capacitor and diode is connected through resistor 144 to the negative potential terminal, the capacitor 140 and resistor 144 providing a differentiating network. The base of transistor 138 is connected to the same terminal through the tunnel diode 146. The base connections of transistor 132 include the usual diode 147 and resistor 149, and the latter is connected to the collector of transistor 132. The junction between diode 142 and 146 is connected to the positive supply terminal through the voltage divider consisting of resistors 153 and 155, their junction being connected to connection 148 through capacitor 151. Connection 148 is connected through resistor 150 to provide an input to the base of transistor 152, the collector of which is joined through resistor 156 to the terminal 154 providing an in-phase reference potential, which terminal is also shown associated with network 56.

The collector of transistor 152 is connected through resistor 158 to the input of a low pass filter 160 which may be of any conventional type. This filter provides its output to the line 166, including the parallel arrangement of resistor 168 and capacitor 170, for slight phase shift correction, to variable resistance 172, fixed resistor 174, and choke 176 and connection 178 to the lower terminal of the winding 14 of transformer 13, previously described.

The junction between resistances 172 and 174 is connected through resistor 180 and resistor 182 to the contact of potentiometer 58. A resistor 184 connects to ground the junction of resistors 180 and 182.

It will be convenient at this point to go into the details of operation of the portions of the circuit just described, i.e., the conversion of the variable frequency signals from the blocking oscillator into an alternating current having an amplitude accurately proportional to the frequency. This result is secured by sampling a reference alternating current signal by pulses at the blocking oscillator frequency. For proportionality to be maintained, several matters are necessary. The sampling pulses must be at a frequency considerably exceeding the frequency of the alternating current signal to be produced; the sampling operation must have the same sampling characteristics irrespective of change of sign of the alternating excursions of the sampled signal; and the sampling must produce pulses each of which must have an area or magnitude, in the sense of average value, proportional to the amplitude of the reference signal, the constant of proportionality remaning accurately fixed. The magnitude of each pulse looking toward ultimate averaging or smoothing of the pulses, has the dimensions of amplitude times time. It may be here noted that the first criterion is important only when the desired current has a significant value. In the present instance a frequency of, say 50 kilocycles per second represents full flow rate so that even at 0.5% of this the frequency is 250 cycles per second giving fairly good sampling. For lower flow rates the proportionality is progressively poorer; but the contribution to total flow is also correspondingly less significant.

The third criterion may be achieved in different ways. In the modification so far described it is achieved by sampling by pulses of constant duration; in a later modification it is achieved by utilizing energy storage of a capacitor.

The accomplishment of these results will be apparent from the following:

The input of variable frequency signals to the portion of the circuit now being considered is from connection 106, positive signals being used for the controls. Differentiation of these signals is provided by capacitor 140 and resistor 144 and the resulting signals are impressed on the anode of diode 142 which transmits positive signals to the base of transistor 138 and to the anode of the tunnel diode 146. The "normal" state of the multivibrator including the transistors 130 and 132 is that of being inoperative for triggering by input pulses from the crystal-controlled oscillator. The reason for this is the normally cut-off condition of transistor 138 due to lack of current flow from its base through tunnel diode 146, now in the condition of the initial slope of its I–V characteristic, to the negative supply line so that its base is normally at substantially the same potential as its emitter. Under these conditions the transistor 130 is in a normally conducting state and transistor 132 is normally non-conducting. Accordingly, although square waves originating in transistor 128 from the oscillator are normally applied to the multivibrator it does not operate. Referring to FIGURE 2, there is represented at A the waveform at the collector of transistor 128, the frequency being that of the oscillator, e.g., 100 kilocycles per second. At B there are indicated the pulses emitted from the blocking oscillator and appearing on line 106. These pulses are quite short as already described. The pulses, of course, bear no particular time relationship to the waveform at A.

When a pulse B rises, a positive pulse is imposed on the base of transistor 138 rendering this transistor conductive. At the same time this positive pulse drives the tunnel diode over its peak into its low current valley so that the supply from the positive line through resistors 149 and 147 maintains the positive potential at the base of transistor 138 holding it in its conductive state, the current through these resistors driving the tunnel diode to a point on its second rise. The condition of the base of transistor 138 is shown at C. The multivibrator is thus rendered active but nothing occurs until the first negative excursion of the signal at the collector of 128 following the event just mentioned. When this occurs, the multivibrator is tripped to its alternate state by the impression of a negative pulse on the base of transistor 130, cutting this transistor off. Concurrently, as its collector goes positive, a positive signal is applied to the base of transistor 152 through connection 148 rendering it non-conductive. The potential of the base of transistor 152 is indicated at D.

Positive signals from the oscillator to the base of transistor 130 are blocked by the diode in series with this base, and are also blocked from the base of transistor 132 by diode 147. The multivibrator accordingly retains its state. However, on the next negative signal from the oscillator the multivibrator is switched back to its original condition, again restoring the transistor 152 to its conducting state as indicated at D'. At the same time a negative pulse through capacitor 151 cuts off the transistor 138, as shown at C', and restores the tunnel diode 146 to its original state, to keep transistor 138 off, so that the multivibrator is again rendered inoperative. The cycle of operation then repeats only upon the rise of another pulse B.

Attention may now be given particularly to the pulses D. As will be evident, these pulses have a duration accurately fixed at the length of a cycle of the waveform A. They repeat at the frequency of the pulses B. These are, then, proper sampling pulses as set by the criteria given above. The action of transistor 152 also satisfies the requirement of uniform sampling. The reference alternating signal is applied at terminal 154 and, when the transistor 152 is conducting, the collector is essentially at ground potential due to the relatively high resistance at 156. During the conductive period, therefore, the input at 158 to the filter 160 is essentially at ground. However, when the transistor 152 is rendered non-conductive, the potential at 158 rises to the then existing potential of terminal 154. It may be pointed out that when the transistor 152 is rendered conductive by reason of the condition of its base it passes both positive and negative excursions of the reference wave, and is highly conductive even though its conductivity may be considered as varying to some extent as between positive and negative half cycles.

The result of the foregoing is that pulses of uniform duration corresponding in amplitude to the reference wave form are delivered to the low pass filter 160. This serves to smooth out, i.e. integrate, these pulses to give rise to an in-phase current through the line 166 bearing to the original waveform an amplitude ratio which is strictly proportional to the frequency of sampling, i.e. the frequency of the pulses B. The sampling must, of course, be at a rate such that for good proportionality of amplitude to frequency a large number of samples are taken within any cycle of the reference frequency. The latter being at a sixty cycle per second rate, and the former being normally quite high (for material flow rates), the relationship between frequency and amplitude is very accurately maintained. The broader function of this operation will be brought out later in consideration of the overall functioning of the system.

The quadrature signal rejection portion of the circuit will now be considered. Quadrature rejection could be accomplished in the same fashion as already described for the nulling of the input signal; but since the measurement of the quadrature components is of no interest, quadrature rejection is effected in a generally similar fashion but with the utilization of circuitry which need not be critical as to linearity of relationship between the quadrature rejection current and a sampling frequency. For example, there is no need to insure sampling pulses of equal width so that the output of a blocking oscillator may be used directly for sampling. In fact, while the circuit about to be described represents a substantial improvement, it may take the form of the quadrature rejection system which is disclosed in my prior application, Serial No. 125,867, filed July 21, 1961. The principal desire is that of securing quadrature rejection without utilizing electromechanical elements, so that the entire system is free of such elements with their attendant disadvantages.

The secondary of transformer 44, tuned by a capacitor in the same fashion as the secondary of transformer 42, has its terminals connected to lines 186 and 188, and its center tap connected to line 190. The line 186 leads to the collector of an NPN transistor 192, while the line 188 leads to the collector of a PNP transistor 194. The bases of both of these transistors are connected through individual resistors to a lead 196 which runs to the junction 202 of a resistor 198 and capacitor 200 connected between a lead 197 to the emitter of transistor 62 and ground. The resistor at 198 and capacitor 200 provide a phase shift so that a quadrature signal appears at terminal 202. The line 190 is connected through a resistor 204 to ground and to a low-pass filter 206 having a terminal capacitor 208. Synchronous rectification takes place in the same fashion as previously described with respect to the in-phase portion of the system, but in this case, without additional amplification, control is effected for a blocking oscillator. The blocking oscillator comprises the transformer 213 having the three windings 212, 214 and 216. A diode 218 is connected across the terminal of the winding 214. Associated with the transformer is the transistor 220. A resistor 210 connects the ungrounded terminal of capacitor 208 to one end of the winding 212, the other end of which is connected to the transistor base. The lower terminal of winding 214 is connected to the transistor collector, the emitter of which is grounded. The arrangement, as will be obvious from what has been previously described, constitutes a blocking oscillator the frequency of which is controlled by the direct potential output of the filter 206. As before, the frequency changes quite rapidly with change of the last potential output. A variable frequency is thus produced which is highly dependent on the magnitude of the quadrature error signal at the output of transformer 44.

The winding 216 of transformer 213 provides output pulses of positive sign to the base of the PNP transistor 226, the emitter of which is grounded, while its collector is connected through line 230 to the junction between resistors 77 and 79. Diode 224 provides clamping to prevent ringing. The resistor 77 is connected to the upper terminal of resistor 79, the lower terminal of which is connected to 197 as previously described. While 197 provides an in-phase signal, the resistor 79 together with resistor 77 and capacitor 25 provides a smoothing and phase shifting action so that the signal produced at the ungrounded terminal of capacitor 25 is a quadrature signal. By reason of the pulsing action of the transistor 226 the magnitude of the quadrature correcting signal is controlled by a sampling action so that there is provided a feedback to the system from the transformer 13 to null the quadrature component appearing at the secondary of transformer 42. This means that there is nulling of quadrature components, irrespective of origin, through the main portion of the system with the effect of avoiding overloading of components and, by possible phase shift of qudrature signals, the generation of spurious in-phase signals. An important aspect of the system is the nulling of the quadrature signals at the source of the in-phase signals, namely directly at the location at which these signals are generated, the electrodes.

Quadrature signals may originate in the connections from the electrodes 12 and will be of unpredictable magnitude and phase within limits as they appear at the upper terminal of capacitor 25. The nulling quadrature signals delivered through resistor 77 are of a predetermined phase, say +90°. In order to effect nulling of the first mentioned quadrature signals there must be injected to the terminal effective nulling quadrature signals of either +90° or —90°. By injecting through resistor 75 signals of —90° equal in amplitude to at least half the maximum amplitude of signals injected through resistor 77, the required capability of reversal of phase is attained, so as to null the undesired signals irrespective of their phase.

Since the details of operation of the subcomponents of the system have been described, there will now be more readily apparent the overall operation which is as follows:

In view of the nulling of the quadrature signals as just described, these may be regarded as non-existent during operation, and attention may be accordingly focused solely on the in-phase signals.

As will now be evident, due to the feedback opposing the signals originating at the electrodes, the error signals fed through connections 20 and 22 to the input of the amplifier 30 are very small, the feedback signals being, for all practical purposes of accuracy of measurement, substantially equal in magnitude to the electrode signals. The minute error signals are highly amplified in the amplifier 30 and, delivered through transformer 42, give rise to large changes of frequency of the blocking oscillator for very minute changes in the error signal. As already described in detail, the blocking oscillator, by sampling, through the multivibrator, of a reference in-phase signal, gives rise to the in-phase feedback signal to transformer 13 with a very precise relationship of amplitude of this signal to the frequency. Because of the close equality between the feedback signal and the electrode signal, the frequency of the blocking oscillator is essentially linearly proportional also to the electrode signal which in turn is accurately proportional to flow rate. Thus, counting the number of pulses over a predetermined interval by means of the digital register 114 there is obtained an accurate integration and measure of total flow.

While the system has been described as used for the measurement of total flow (generally of primary interest) it will be obvious that flow rate may be measured merely by the introduction of means for measuring the alternating feedback current through connection 178. An indicating or recording meter may be here used. Flow rate may, of course, also be measured, if desired by integrating over short intervals the pulses at the base of transistor 152 or at the base of transistor 138 after suitable amplitude limiting, or by counting, over short intervals, the pulses emited to register 114.

The described apparatus has been found to have an accuracy better than 0.5% through a range of flow rates of 50 to 1. By reason of the sampling technique which is used temperature stability without compensation has been found to be within 0.005% per degree centigrade. Stability of 0.1% against voltage variations of 10% has also been secured. Because of the absence of electromechanical elements, difficulties with respect to dead zones, hunting, fluctuations, etc., do not exist.

Figure 1B:
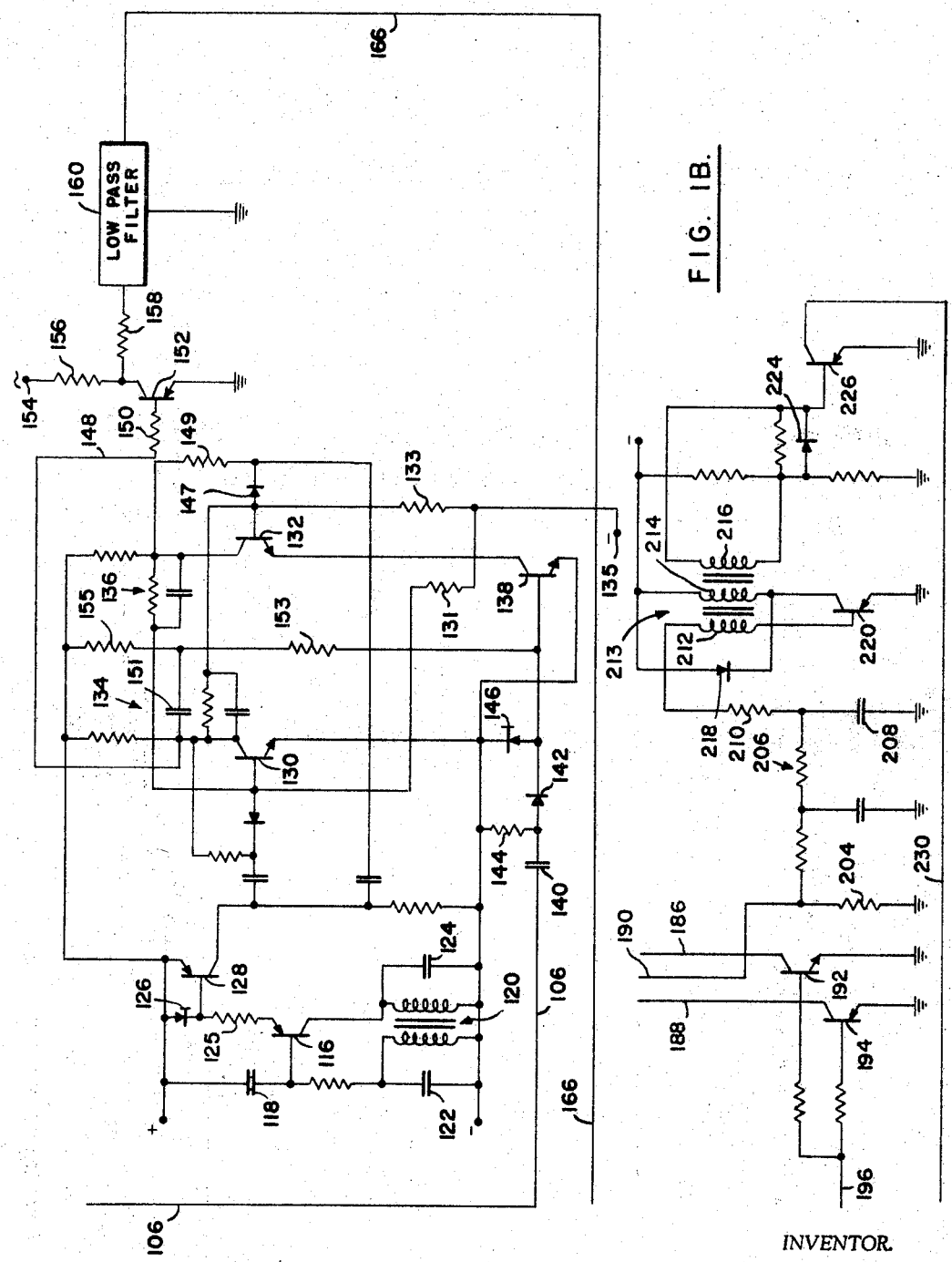
Figure 3:
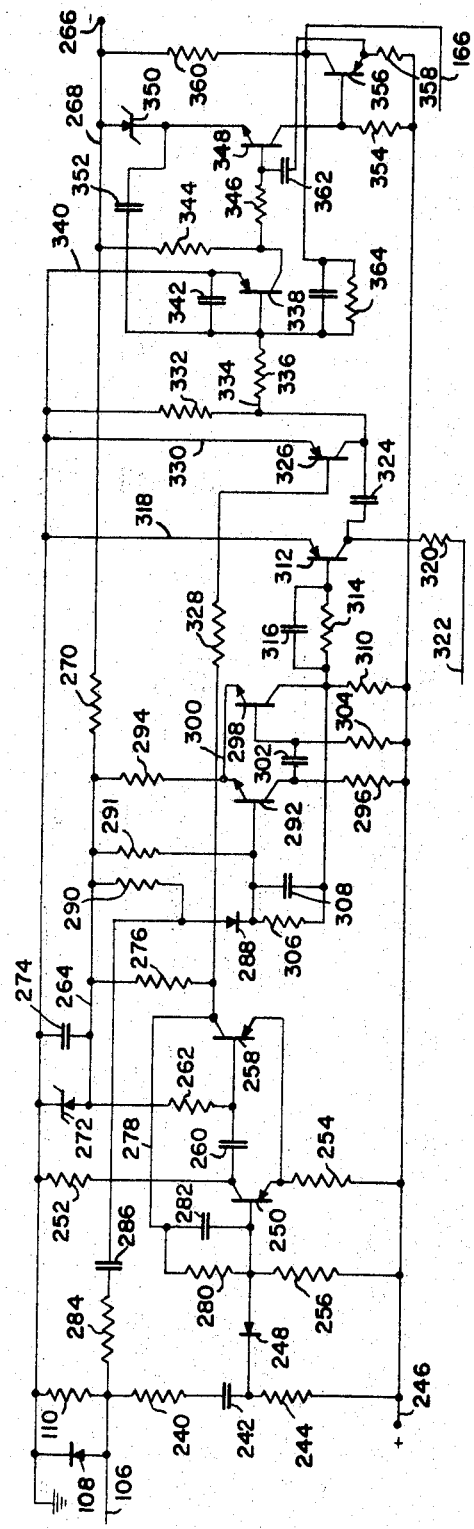
FIGURE 3 is a schematic diagram of an alternative form of frequency-to-amplitude converter.

FIGURE 3 illustrates an alternative form of frequency-to-alternating current converter which may be used in place of the portion of the circuit of FIGURES 1A and 1B encompassed between the leads 106 and 166. From the standpoint of association with the remainder of a circuit, what is shown in FIGURE 3 may be considered as having its input from the connection 106 to provide its output through connection 166 to secure the same results as already described.

To tie in with the circuit previously described, the clamping diode 108 and resistor 110 are repeated in FIGURE 3. Running from line 106 there is the series arrangement of resistor 240, capacitor 242 and resistor 244, the latter connected to a positive supply line 246. The junction between capacitor 242 and resistor 244 is connected through the diode 248 to the base of transistor 250, the diode being arranged to pass negative pulses to this base.

The collector of transistor 250 is connected to the ground line through resistor 252, and its emitter is connected through resistor 254 to positive supply line 246. The base of a transistor 258 is coupled to the collector of transistor 250 through capacitor 260 and is connected through resistor 262 to a regulated negative supply line 264 which is fed from a negative terminal 266 through line 268 and resistor 270. A Zener diode 272, shunted by capacitor 274, maintains the line 264 at a constant negative potential. The collector of transistor 258 is connected to this negative line 264 through resistor 276. Feedback is provided from this same collector through connection 278 and the RC network, consisting of resistor 280 and capacitor 282, to the base of transistor 250. The emitters of transistors 250 and 258 are connected directly together.

The line 106 feeds through resistor 284, capacitor 286 and diode 288 positive pulses to the base of the NPN transistor 292. The anode of diode 288 is connected to the negative supply line 264 through resistor 290, and the base of transistor 292 is connected to the same line through resistor 291. The emitter of transistor 292 is also connected to this line through resistor 294. Its collector is connected to the positive supply line 246 through resistor 296.

The emitter of transistor 292 is connected at 300 to the emitter of transistor 298, the base of which is coupled to the collector of transistor 292 through capacitor 302. The base of transistor 298 is connected to the positive supply line through resistor 304. Its collector has a feedback connection to the base of transistor 292 through the RC network consisting of resistor 306 and capacitor 308. This collector is also connected through resistor 310 to the positive line 346. It is also coupled to the base of transistor 312 through the RC network consisting of resistor 314 and capacitor 316.

The emitter of transistor 312 is connected at 318 to ground and its collector is connected through resistor 320 to a line 322 which runs to the line 60 shown and described in connection with FIGURES 1A and 1B.

A capacitor 324 connects the collectors of transistors 312 and 326, the base of the latter of which is connected through resistor 328 to the collector of transistor 258. The emitter of transistor 326 is connected to ground at 330. The collector of transistor 326 is connected to ground through resistor 332 and through connection 334 and resistor 336 to the base of a transistor 338. The emitter of the last is connected to ground at 340 and through capacitor 342 to its base. Its collector is connected through resistor 344 to the negative supply line 268. It is also connected through resistor 346 to the base of an NPN transistor 348, the emitter of which is connected through the Zener diode 350 to negative line 268. This emitter is also connected through capacitor 352 to the base of transistor 338.

The collector of transistor 348 is connected to the positive supply line 246 through resistor 354, and is directly connected to the base of a PNP transistor 356 having its emitter connected through resistor 358 to the same positive line 246. The collector of transistor 356 is connected through resistor 360 to the negative line 268 and provides a feedback through capacitor 362 to the base of transistor 348 and through an RC network consisting of resistor 364 and capacitor 366 to the base of transistor 338.

Output is provided from the collector of transistor 356 to the line 166 previously described, this output being a sixty cycle signal, with some ripple but having an amplitude of its in-phase component which is accurately proportional to the frequency of the blocking oscillator. This, then, provides the same feedback as the frequency-to-alternating current converter previously described.

The operation of the circuit shown in FIGURE 3 is as follows:

As in the case of the previous modification, the objective of the sampling circuit is to secure samples having areas (magnitudes) proportional to the amplitude of the sampled waveform at the time of sampling. ("Area" here is in dimensions of amplitude times time.) Whereas in the earlier modification this end was secured by the use of a standard fixed frequency oscillator controlling fixed durations of pulses, in this last circuit the required result is achieved by utilizing exponential decays of capacitor charges.

Figure 4:
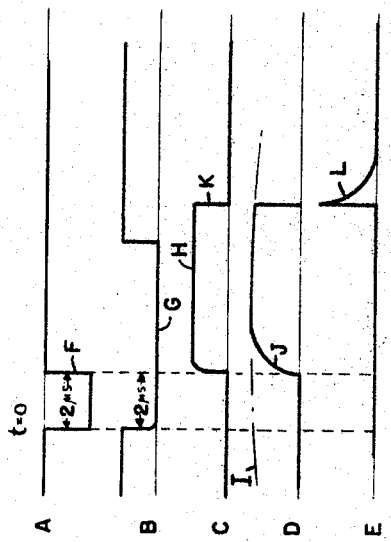
FIGURE 4 is a waveform diagram explanatory of the operation of the converter of FIGURE 3.

Referring to FIGURE 4, as shown at A a pulse F appears on line 106 which may have an approximate duration of two microseconds though, as will appear, this is not critical. The beginning of this pulse may be considered as establishing a zero time. The transistors 250 and 258 and their connections constitute an astable multivibrator which when tripped will return to its stable state after approximately ten microseconds. The transistors 292 and 298 and their connections constitute a second astable multivibrator having approximately the same duration of its astable state. Upon the negative excursion of the pulse F, the connection to the base of transistor 250 through diode 248 trips its multivibrator to its astable state as indicated at G in graph B. The positive-going return of pulse F similarly trips to its astable state the second multivibrator through the connection to the base of transistor 292 through diode 288. The astable state of this second multivibrator is indicated at H in graph C.

As has been described, the base of transistor 326 is connected to the collector of transistor 258 of the first astable multivibrator so that transistor 326, normally nonconducting, is turned on when this multivibrator is in its astable state. Transistor 312 is normally conducting and is turned off during the astable state of the second multivibrator by reason of its connection to the collector of transistor 298.

At zero time capacitor 324 has been discharged, noting that its left-hand terminal is connected to the ground line through normally conducting transistor 312 and its right-hand terminal is connected to the same line through resistor 332. At zero time when transistor 326 becomes conductive nothing of significance occurs. However, at time equal to two microseconds the grounded condition of the left-hand terminal of capacitor 324 is terminated so that it may charge as indicated at J through resistor 320 and reference signal connection 322 to the potential of this signal. The reference signal is indicated at I in graph D with a highly exaggerated curvature merely for purposes of explanation. The charge on capacitor 324 reaches substantially its full value well before the next event in the operation, so that the potential of its left-hand terminal may be considered as rising substantially to that of line 322. The reference signal I will only change very slightly during the complete sampling operation.

When the first of the multivibrators reverts to its initial condition, the transistor 326 is cut off so that no change in the charge of capacitor 324 occurs, the right-hand terminal being returned to ground through resistor 332. When the second multivibrator reverts to its original condition as indicated at K transistor 312 becomes conductive and provides a short circuit to ground for the left-hand terminal of the capacitor. Discharge then occurs as indicated by the exponential drop at L in graph E representing the current flow through resistors 332 and 334, the former being connected directly to ground and the latter effectively so through the following circuitry. Graph E then represents the signal applied to the base of transistor 338.

The sample consisting of the pulse L has an amplitude equal to that of the amplitude of the reference signal at the time transistor 312 is rendered conductive. As may be readily shown mathematically, the area of the pulse for an exponential discharge is proportional to its amplitude so that the requirement of the sampling in this respect is satisfied. Averaging of the pulses L then provides a signal which is directly proportional to frequency.

This sampling is repeated at the frequency of the blocking oscillator. The samples are averaged, in effect, over short intervals of time by the buffer amplifier-averager provided by transistors 338, 348 and 356 and their connections. This arrangement for buffering and averaging is of a conventional type and need not be specially considered, the averaging, or smoothing, being provided, in effect, by the RC network 346, 362 with feedback through capacitor 352. The result is the output from the collector of transistor 366 on line 166 of an in-phase 60 cycle wave, with some ripple, having as the amplitude of its fundamental a value very precisely proportional to the frequency of sampling. It will be evident that the circuit shown in FIGURE 3 has the same overall function between its input and output as that previously described. The RC circuits involved are quite stable and residual drifts therein can only affect to a very negligible extent the areas of individual samples. It may be noted that the operation, involving full-on and full-off conditions of the controlling transistors is essentially independent of supply voltage variations.

It may be here noted that while the reference signals are split into in-phase and quadrature components before sampling in both of the described modifications, the samplings, at the different frequencies, may be of the same reference signals and phase shifts and phase corrections may be made of the pulse-derived signals for proper nulling feedbacks.

Considering the overall operation of the flowmeter described, it may be pointed out that there is a quite considerable independence of the magnitude of the alternating supply voltage to the system. If the supply voltage increases, the strength of the magnetic field threading the fluid conduit increases and the electrode signals increase. But the sampling action by the pulses is then of a correspondingly increased amplitude wave providing correspondingly larger feedback. The frequency used for integration to provide a total flow measurement or, as discussed above, to provide a flow rate measurement remains essentially the same for any given flow. The instrument may accordingly be calibrated, in effect, for a particular frequency representative of a particular flow, with the frequency proportional to the rate of flow because of the linear relationship of the amplitude of electrode signals to the flow rate. This substantial independence of line voltage variations is especially important in industrial areas, for example, where poor regulation may exist.

While the arrangements for converting frequency linearly to amplitude of a fixed frequency wave are particularly useful for the type of feedback system described, it will be evident that there are many other uses for such a system wherever it is desired to translate a frequency into a proportional amplitude signal. In effect, the action is that of a simple, but very accurate, tachometer and these systems might be used merely to measure the rate of rotation of a shaft or the like by causing rotation to emit pulses. It may be noted that the sampling technique involved may well be used in a direct current system since the sampled signal may be direct and the samples may be integrated to provide merely a varying direct output signal to a meter or the like.

It will be evident that numerous variations may be made in what has been specifically described without departing from the invention as defined in the following claims.

What is claimed is:

1. In combination, means providing an input circuit, means providing a variable signal to said input circuit, a variable frequency pulse generator, means responsive to output signals from said input circuit to control the frequency of pulses produced by said generator means providing a reference signal, means responsive to pulses produced by said generator to sample said reference signal at the frequency of said pulses to produce variable pulses each of which has a magnitude approximately proportional to the amplitude of said reference signal at the time of sampling, said pulses having a frequency considerably exceeding that of changes of said reference signal, means smoothing said variable pulses and providing to said input circuit a second signal opposing said variable signal to effect substantial nulling of said variable signal at the output of said circuit, and means responsive to the nulling of said variable signal to provide an output signal.

2. In combination, means providing an input circuit, means providing a variable alternating signal to said input circuit, a variable frequency pulse generator, means responsive to output signals from said input circuit to control the frequency of pulses produced by said generator, means providing a reference signal having the frequency of said variable signal, means responsive to pulses produced by said generator to sample said reference signal at the frequency of said pulses to produce variable pulses each of which has a magnitude approximately proportional to the amplitude of said reference signal at the time of sampling, said pulses having a frequency considerably exceeding that of changes of said reference signal, means smoothing said variable pulses and providing to said input circuit a second signal in phase with but opposing said variable signal to effect substantial nulling of said variable signal at the output of said circuit, and means responsive to the nulling of said variable signal to provide an output signal.

3. In combination, means providing a circuit, a variable frequency pulse generator, means responsive to output signals from said circuit to control the frequency of pulses produced by said generator, means providing a reference signal, means responsive to pulses produced by said generator to sample said reference signal at the frequency of said pulses to produce variable pulses each of which has a magnitude approximately proportional to the amplitude of said reference signal at the time of sampling, said pulses having a frequency considerably exceeding that of changes of said reference signal, and means smoothing said variable pulses and providing to said circuit a signal to effect substantial nulling of a predetermined type of signal component at the output of said circuit.

4. In combination, means providing a circuit, a variable frequency pulse generator, means responsive to output signals from said circuit to control the frequency of pulses produced by said generator, means providing an alternating reference signal, means responsive to pulses produced by said generator to sample said reference signal at the frequency of said pulses to produce variable pulses each of which has a magnitude approximately proportional to the amplitude of said reference signal at the time of sampling, said pulses having a frequency considerably exceeding that of changes of said reference signal, and means smoothing said variable pulses and providing to said circuit a signal to effect substantial nulling of a signal component at the output of said circuit which is in phase with said reference signal.

5. In combination, means providing an input circuit, means providing a variable alternating signal to said input circuit, a variable frequency pulse generator, means responsive to output signals from said input circuit to control the frequency of pulses produced by said generator, means providing a reference signal having the frequency of said variable signal, means responsive to pulses produced by said generator to sample said reference signal at the frequency of said pulses to produce variable pulses each of which has a magnitude approximately proportional to the amplitude of said reference signal at the time of sampling, said pulses having a frequency considerably exceeding that of changes of said reference signal, and means smoothing said variable pulses and providing to said circuit a second signal at the frequency of said variable signal opposing a signal component in quadrature with said variable signal at the output of said circuit.

6. In combination, means providing an input circuit, means providing a variable alternating signal to said input circuit, a variable frequency pulse generator, means responsive to output signals from said input circuit which are in phase with said variable signal to control the frequency of pulses produced by said generator, means providing alternating reference signals having the frequency of said variable signal, means responsive to pulses produced by said generator to sample a reference signal at the frequency of said pulses to produce variable pulses each of which has a magnitude approximately proportional to the amplitude of said reference signal at the time of sampling, said pulses having a frequency considerably exceeding that of changes of said reference signal, means smoothing said variable pulses and providing to said circuit a second signal in phase with but opposing said variable signal to effect substantial nulling of said variable signal at the output of said circuit, a second variable frequency pulse generator, means responsive to output signals from said input circuit which are in quadrature with said variable signal to control the frequency of pulses produced by said second generator, means responsive to pulses produced by said second generator to sample a reference signal at the frequency of the last mentioned pulses to produce variable pulses each of which has a magnitude approximately proportional to the amplitude of the last mentioned reference signal at the time of sampling, the last mentioned pulses having a frequency considerably exceeding that of changes of the last mentioned reference signal, and means smoothing the last mentioned variable pulses and providing to said circuit a signal at the frequency of said variable alternating signal and in quadrature with said variable signal to effect substantial nulling of quadrature signal components at the output of said circuit, and means responsive to the nulling of said variable signal to provide an output signal.

7. In combination, means providing an input circuit, means providing a variable signal to said input circuit, a variable frequency pulse generator, means responsive to output signals from said input circuit to control the frequency of pulses produced by said generator, means providing a reference signal, means responsive to pulses produced by said generator to sample said reference signal at the frequency of said pulses to produce variable pulses of constant duration each of which has an amplitude substantially proportional to the amplitude of said reference signal at the time of sampling, said pulses having a frequency considerably exceeding that of changes of said reference signal, means smoothing said variable pulses and providing to said input circuit a second signal opposing said variable signal to effect substantial nulling of said variable signal at the output of said circuit, and means responsive to the nulling of said variable signal to provide an output signal.

8. In combination, means providing an input circuit, means providing a variable signal to said input circuit, a variable frequency pulse generator, means responsive to output signals from said input circuit to control the frequency of pulses produced by said generator, means providing a reference signal, means responsive to pulses produced by said generator to sample said reference signal at the frequency of said pulses to produce variable pulses of constant duration each of which has an amplitude substantially proportional to the amplitude of said reference signal at the time of sampling, said pulses having a frequency considerably exceeding that of changes of said reference signal, means smoothing said variable pulses and providing to said input circuit a second signal opposing said variable signal to effect substantial nulling of said variable signal at the output of said circuit, and means counting the pulses produced by said generator.

9. In combination, means providing an input circuit, means providing a variable alternating signal to said input circuit, a variable frequency pulse generator, means responsive to output signals from said input circuit to control the frequency of pulses produced by said generator, means providing a reference signal having the frequency of said variable signal, means responsive to pulses produced by said generator to sample said reference signal at the frequency of said pulses to produce variable pulses of constant duration each of which has an amplitude substantially proportional to the amplitude of said reference signal at the time of sampling, said pulses having a frequency considerably exceeding that of changes of said reference signal, means smoothing said variable pulses and providing to said circuit a second signal in phase with but opposing said variable signal to effect substantial nulling of said variable signal at the output of said circuit, and means responsive to the nulling of said variable signal to provide an output signal.

10. In combination, means providing an input circuit, means providing a variable alternating signal to said input circuit, a variable frequency pulse generator, means responsive to output signals from said input circuit to control the frequency of pulses produced by said generator, means providing a reference signal having the frequency of said variable signal, means responsive to pulses produced by said generator to sample said reference signal at the frequency of said pulses to produce variable pulses of constant duration each of which has an amplitude substantially proportional to the amplitude of said reference signal at the time of sampling, said pulses having a frequency considerably exceeding that of changes of said reference signal, means smoothing said variable pulses and providing to said circuit a second signal in phase with but opposing said variable signal to effect substantial nulling of said variable signal at the output of said circuit, and means counting the pulses produced by said generator.

11. In combination, means providing a circuit, a variable frequency pulse generator, means responsive to output signals from said circuit to control the frequency of pulses produced by said generator, means providing a reference signal, means responsive to pulses produced by said generator to sample said reference signal at the frequency of said pulses to produce variable pulses of constant duration each of which has an amplitude substantially proportional to the amplitude of said reference signal at the time of sampling, said pulses having a frequency considerably exceeding that of changes of said reference signal, and means smoothing said variable pulses and providing to said circuit a signal to effect substantial nulling of a predetermined type of signal component at the output of said circuit.

12. In combination, means providing a circuit, a variable frequency pulse generator, means responsive to output signals from said circuit to control the frequency of pulses produced by said generator, means providing a reference signal, means responsive to pulses produced by said generator to sample said reference signal at the frequency of said pulses to produce variable pulses of constant duration each of which has an amplitude substantially proportional to the amplitude of said reference signal at the time of sampling, said pulses having a frequency considerably exceeding that of changes of said reference signal, and means smoothing said variable pulses and providing to said circuit a signal to effect substantial nulling of a predetermined type of signal component at the output of said circuit, and means counting the pulses produced by said generator.

13. In combination, means providing an input circuit, means providing a variable alternating signal to said input circuit, a variable frequency pulse generator, means responsive to output signals from said input circuit which are in phase with said variable signal to control the frequency of pulses produced by said generator, means providing alternating reference signals having the frequency of said variable signal, means responsive to pulses produced by said generator to sample a reference signal at the frequency of said pulses to produce variable pulses of constant duration each of which has an amplitude substantially proportional to the amplitude of said reference signal at the time of sampling, said pulses having a frequency considerably exceeding that of changes of said reference signal, means smoothing said variable pulses and providing to said input circuit a second signal in phase with but opposing said variable signal to effect substantial nulling of said variable signal at the output of said circuit, a second variable frequency pulse generator, means responsive to output signals from said input circuit which are in quadrature with said variable signal to control the frequency of pulses produced by said second generator, means responsive to pulses produced by said second generator to sample reference signal at the times of occurrence of the last mentioned pulses to produce variable pulses each of which has a magnitude substantially proportional to the amplitude of the last mentioned reference signal at the time of sampling, the last mentioned pulses having a frequency considerably exceeding that of changes of the last mentioned reference signal, and means smoothing the last mentioned variable pulses and providing to said circuit a signal in quadrature with said variable signal to effect substantial nulling of quadrature signal components at the output of said circuit.

14. In combination, means providing an input circuit, means providing a variable alternating signal to said input circuit, a variable frequency pulse generator, means responsive to output signals from said input circuit which are in phase with said variable signal to control the frequency of pulses produced by said generator, means providing alternating reference signals having the frequency of said variable signal, means responsive to pulses produced by said generator to sample a reference signal at the frequency of said pulses to produce variable pulses of constant duration each of which has an amplitude substantially proportional to the amplitude of said reference signal at the time of sampling, said pulses having a frequency considerably exceeding that of changes of said reference signal, means smoothing said variable pulses and providing to said input circuit a second signal in phase with but opposing said variable signal to effect substantial nulling of said variable signal at the output of said circuit, a second variable frequency pulse generator, means responsive to output signals from said input circuit which are in quadrature with said variable signal to control the frequency of pulses produced by said second generator, means responsive to pulses produced by said second generator to sample a reference signal at the frequency of the last mentioned pulses to produce variable pulses each of which has a magnitude substantially proportional to the amplitude of the last mentioned reference signal at the time of sampling, the last mentioned pulses having a frequency considerably exceeding that the changes of the last mentioned reference signal, means smoothing the last mentioned variable pulses and providing to said circuit a signal in quadrature with said variable signal to effect substantial nulling of quadrature signal components at the output of said circuit, and means counting the pulses produced by the first mentioned generator.

15. A flowmeter comprising a conduit for flowing fluid, electromagnetic means providing a magnetic field transverse to said conduit, means supplying alternating current to said electromagnetic means, electrodes exposed to fluid flowing through said conduit and located on a line extending transversely through said field to pick up signals generated by flow of fluid through said field, means providing an input circuit, connections from said electrodes to provide variable alternating signals therefrom to said input circuit, a variable frequency pulse generator, means responsive to output signals from said input circuit to control the frequency of pulses produced by said generator, means providing a reference signal having the frequency of said current, means responsive to pulses produced by said generator to sample said reference signal at the frequency of said pulses to produce variable pulses of constant duration each of which has an amplitude approximately proportional to the amplitude of said reference signal at the time of sampling, said pulses having a frequency considerably exceeding that of changes of said reference signal, means smoothing said variable pulses and providing to said circuit a second signal in phase with but opposing said variable signal to effect substantial nulling of said variable signal at the output of said circuit, and means counting the pulses produced by said generator.

16. A flowmeter comprising a conduit for flowing fluid, electromagnetic means providing a magnetic field transverse to said conduit, means supplying alternating current to said electromagnetic means, electrodes exposed to fluid flowing through said conduit and located on a line extending transversely through said field to pick up signals generated by flow of fluid through said field, means providing an input circuit, connections from said electrodes to provide variable alternating signals therefrom to said input circuit, a variable frequency pulse generator, means responsive to output signals from said input circuit which are in phase with said variable signal to control the frequency of pulses produced by said generator, means providing alternating reference signals having the frequency of said current, means responsive to pulses produced by said generator to sample a reference signal at the frequency of said pulses to produce variable pulses of constant duration each of which has an amplitude substantially proportional to the amplitude of said reference signal at the time of sampling, said pulses having a frequency considerably exceeding that of changes of said reference signal, means smoothing said variable pulses and providing to said input circuit a second signal in phase with but opposing said variable signal to effect substantial nulling of said variable signal at the output of said circuit, a second variable frequency pulse generator, means responsive to output signals from said input circuit which are in quadrature with said variable signal to control the frequency of pulses produced by said second generator, means responsive to pulses produced by said second generator to sample a reference signal at the frequency of the last mentioned pulses to produce variable pulses each of which has a magnitude substantially proportional to the amplitude of the last mentioned reference signal at the time of sampling, the last mentioned pulses having a frequency considerably exceeding that of changes of the last mentioned reference signal, means smoothing the last mentioned variable pulses and providing to said input circuit a signal in quadrature with said variable signal to effect substantial nulling of quadrature signal components at the output of said circuit, and means counting the pulses produced by the first mentioned generator.

References Cited by the Examiner
UNITED STATES PATENTS

| | | | |
|---|---|---|---|
| 2,416,306 | 2/1947 | Grieg | 332—1 |
| 2,595,092 | 4/1952 | Mounce | 328—141 |
| 2,889,521 | 6/1959 | Levine et al. | 332—9 |
| 2,958,735 | 11/1960 | Maier et al. | 332—1 |
| 3,094,000 | 6/1963 | Kass | 73—194 |
| 3,142,806 | 7/1964 | Fernandez | 329—107 |

RICHARD C. QUEISSER, *Primary Examiner.*